United States Patent
Lee et al.

(10) Patent No.: US 9,266,273 B2
(45) Date of Patent: Feb. 23, 2016

(54) APPARATUS FOR PRODUCING A THERMOPLASTIC RESIN FILM

(75) Inventors: Doseok Lee, Otsu (JP); Hiroyuki Inoue, Otsu (JP); Hiroyuki Aso, Otsu (JP)

(73) Assignee: Toray Industries, Inc., Tokyo (JP)

( * ) Notice: Subject to any disclaimer, the term of this patent is extended or adjusted under 35 U.S.C. 154(b) by 423 days.

(21) Appl. No.: 13/500,819

(22) PCT Filed: Oct. 4, 2010

(86) PCT No.: PCT/JP2010/067348
§ 371 (c)(1),
(2), (4) Date: Apr. 6, 2012

(87) PCT Pub. No.: WO2011/043285
PCT Pub. Date: Apr. 14, 2011

(65) Prior Publication Data
US 2012/0200002 A1    Aug. 9, 2012

(30) Foreign Application Priority Data

Oct. 7, 2009  (JP) ................................ 2009-233133

(51) Int. Cl.
*B29C 47/88* (2006.01)
*B29C 47/76* (2006.01)
*B29C 47/00* (2006.01)
*B29L 11/00* (2006.01)
*B29L 7/00* (2006.01)
*B29C 47/92* (2006.01)

(52) U.S. Cl.
CPC ........... *B29C 47/8875* (2013.01); *B29C 47/768* (2013.01); *B29C 47/8845* (2013.01); *B29C 47/0021* (2013.01); *B29C 47/92* (2013.01); *B29C 2947/00* (2013.01); *B29L 2007/00* (2013.01); *B29L 2011/0075* (2013.01)

(58) Field of Classification Search
CPC .................................................... B29C 47/8875
See application file for complete search history.

(56) References Cited

U.S. PATENT DOCUMENTS

| 5,091,134 A | 2/1992 | Oshima et al. |
| 2010/0059036 A1* | 3/2010 | Inoue et al. ................ 126/21 R |

FOREIGN PATENT DOCUMENTS

| JP | 59-71828 A | 4/1984 |
| JP | 61-121923 A | 6/1986 |
| JP | 3-239525 A | 10/1991 |
| JP | 7-266406 A | 10/1995 |

(Continued)

OTHER PUBLICATIONS

Machine translation of JP 7-266406 A, Jul. 29, 2014.*

(Continued)

*Primary Examiner* — Benjamin Schiffman
(74) *Attorney, Agent, or Firm* — Birch, Stewart, Kolasch & Birch, LLP

(57) ABSTRACT

A thermoplastic resin film manufacturing method and manufacturing device are disclosed wherein an air volume sprayed by the auxiliary cooling device onto the surface of the film on the opposite side thereof to the cooling drum side thereof is set to be larger than the suction amount by an exhaust mechanism between nozzles, to avoid the suction of the air containing the high concentration of oligomer around the extrusion die into the auxiliary cooling device, thereby preventing precipitation and deposition of the oligomer onto spraying nozzles within the auxiliary cooling device and the suction surface of the exhaust mechanism between nozzles.

3 Claims, 2 Drawing Sheets

(56) References Cited

FOREIGN PATENT DOCUMENTS

| | | |
|---|---|---|
| JP | 7-329153 A | 12/1995 |
| JP | 8-290458 A | 11/1996 |
| JP | 2002-200667 A | 7/2002 |
| JP | 2006-27133 A | 2/2006 |
| JP | 2006-281531 A | 10/2006 |
| JP | 2007-320038 A | 12/2007 |
| WO | WO 2008114586 A1 * | 9/2008 |

OTHER PUBLICATIONS

Machine translation of JP 2007-320038 A, Jul. 29, 2014.*
Translation of JP 7-266406 A, Oct. 17, 1995.*
Translation of JP 2007-320038 A, Dec. 13, 2007.*
English translation of JP 2007-320038 A, Dec. 13, 2007.*
English translation of JP 07-266406 A, Oct. 17, 1995.*
International Search Report, dated Nov. 2, 2010, issued in PCT/JP2010/067348.

* cited by examiner

APPARATUS FOR PRODUCING A THERMOPLASTIC RESIN FILM

TECHNICAL FIELD

The present invention relates to a method and apparatus for producing particularly an optical film with few foreign matter defects on the surface thereof and very excellent optical property uniformity.

BACKGROUND ART

In recent years, while various display members represented by liquid crystal displays (LCD) and plasma display panels (PDP) are being reduced in weight and cost, the market for optical films as important members of displays are being expanded. Optical films use various transparent films made of thermoplastic resins such as polyesters like polyethylene terephthalate (PET), acrylic polymers and polycarbonates (PC) as base materials, and in order to impart functionality to the base materials, for example, protective films (hard coating layers) for preventing defects, anti-reflection layers (AR layers), light-condensing/diffusing layers, polarizing sheets and the like are laminated on the base materials as various surface treatments, for obtaining the optical films. The base films are strongly demanded to be transparent. On the other hand, when the optical films are assembled into large displays and the like, thick films with thicknesses of 150 µm and larger are preferentially used since sufficient strength is requested.

A process for producing such a film includes the steps of extruding a molten thermoplastic resin from an extrusion die and cooling, and in order to produce an excellently transparent film, it is important to quickly cool the extruded thermoplastic resin to a desired temperature. A general method for quickly cooling a thermoplastic resin is a method of bringing the thermoplastic resin into contact with a cooling drum, and in the case where a thick film with a thickness of 150 λm or larger is produced, it is necessary to cool the film also on the film surface not kept in contact with the cooling drum (called the anti-cooling drum-side surface). The reason is that in the case where a thick film is cooled by a cooling drum only, the film temperature of the anti-cooling drum-side surface does not easily decline to a desired temperature. Especially in the case of a film made of a crystalline resin such as a polyester, unless the cooling rate near the glass transition temperature of the thermoplastic resin is high enough, the crystallization of the thermoplastic resin progresses to lower the transparency of the film as a result. As a method for quickly cooling the anti-cooling drum-side surface, known is a method of installing an auxiliary cooling device on the side of the counter-cooling drum-side surface, to promote the cooling of the aforementioned molten thermoplastic resin. The auxiliary cooling device is generally constituted by nozzles (hereinafter referred to as spray nozzles) for spraying cool air toward the thermoplastic resin on the anti-cooling drum-side surface (for example, patent document 1).

However, a thermoplastic resin, for example, a resin like a polyester has a nature that a low molecular weight substance such as an oligomer volatilizes from the surface of the molten resin film while the film is being cooled and solidified. For this reason, the oligomer volatilizing around the auxiliary cooling device is precipitated, for example, on the surfaces of the spray nozzles of the auxiliary cooling device, the surface of the exhaust mechanism, etc. The oligomer precipitated on the surface of the auxiliary cooling device may be guided by the air sprayed from the auxiliary cooling device, to fall and be deposited on the surface of the film, thereby making foreign matter defects. In the case where a distance is taken between the thermoplastic resin film and the spray nozzles in order to prevent that the oligomer precipitated on the surface of the auxiliary cooling device is deposited on the surface of the film, the cooling rate does not rise and the transparency of the film declines. On the other hand, if the tip faces of the spray nozzles are brought as close to the thermoplastic resin film as possible, the cooling rate rises, but the oligomer is precipitated on the auxiliary cooling device and sprayed to the thermoplastic resin film, to be deposited on the surface of the thermoplastic resin film, thereby causing foreign matter defects and other troubles in the subsequent steps.

To address such a problem, known is a method for producing a thermoplastic resin film, in which in the case where a molten thermoplastic resin is cast on a cooling drum, to be cooled and solidified on the cooling drum, for forming a thermoplastic resin film, an air supply means containing spray nozzles extending in the transverse direction of the aforementioned cooling drum is used to spray cooling air toward the film on the side of the anti-cooling drum-side surface of the film, while an inter-nozzle exhaust mechanism containing multiple shielding plates with exhaust holes formed therein is used for sucking and discharging the air near the film, wherein the air supply means and the exhaust means are alternately disposed in the film flow direction (for example, patent document 2).

Further, known is a cooling method, in which in the case where a molten thermoplastic resin is cast on a cooling drum, to be cooled and solidified on the cooling drum, for producing a thermoplastic resin film, spray nozzles of cooling air and the suction faces of an exhaust mechanism are alternately installed along the rotating direction of the cooling drum, wherein the ratio between the total amount of air sucked by all the suction faces and the total amount of air of all the spray nozzles is set at 3.4 to 4.5, in order to positively remove the air in the oligomer atmosphere. Furthermore, known is a technique in which a heater for preventing the precipitation of the oligomer is installed at least on the wall face inside the first suction face of the exhaust mechanism for the oligomer existing around the auxiliary cooling device (for example, patent document 3).

However, the method of positively discharging the air near the film by installing a suction/discharge mechanism in such a manner as to keep portions of the mechanism disposed between respective spray nozzles as described above not only has a problem of sucking the oligomer air near the film and volatilizing at the spray nozzle portions but also the following problem. If the temperature of the molten thermoplastic resin is higher, the oligomer is generated by a larger amount, to form an atmosphere having a high oligomer concentration in the proximity of the aforementioned extrusion die. Since the auxiliary cooling device exhausts a larger amount of air than a sprayed amount of air, highly concentrated oligomer air is also positively sucked. Therefore, as the cooling device is used for a longer period of time, the amount of the oligomer precipitated on the suction faces of the exhaust mechanism increases, and the precipitated oligomer falls on the surface of the thermoplastic resin film, to thereby cause foreign matter defects. As a result, the foreign matter defects increase with the lapse of time, to incur a loss due to the defects caused by use of the auxiliary cooling device, thereby lowering the productivity.

Further, in the case where heaters are installed inside the suction faces of the exhaust mechanism in order to prevent the precipitation of the oligomer on the suction faces, heating the suction faces to such a temperature as to prevent the precipitation of the oligomer is required to lower the cooling efficiency of the spray nozzles near the suction faces, thus causing cooling fluctuation and crystallization defects due to partial crystallization on the surface of the thermoplastic resin film. This, for example, raises the problem of degrading the transparency of the film required to be transparent. Further, even if the suction faces are heated to such an extent of not inhibiting the cooling function, the suction faces of the exhaust mechanism are very likely to have the oligomer precipitated and deposited thereon after use for a long period of time, and it is difficult to achieve both the requirements of sustaining the cooling efficiency and preventing the oligomer contamination.

As described above, the conventional methods did not allow an excellently transparent optical film to be produced while achieving both the requirements of sustaining the cooling rate and reducing the foreign matter defects caused by the dropping of the oligomer precipitated in the auxiliary cooling device.

PRIOR ART DOCUMENTS

Patent Documents

Patent document 1: JP 3-239525 A
Patent document 2: JP 3341451 B
Patent document 3: JP 2006-281531 A
Patent document 4: JP 7-329153 A

SUMMARY OF THE INVENTION

Problem to be Solved by the Invention

In the prior art, it was difficult to achieve both the prevention of crystallization defects and the reduction of foreign matter defects on the film surface by the oligomer, and in order to achieve these requirements, it is necessary to prevent that the air of the highly concentrated oligomer atmosphere existing in the proximity of the aforementioned extrusion die is entrained by the rotation of the cooling drum and sucked by the spray nozzle portions and also to efficiently suck/discharge the oligomer air generated near the film. The object of this invention is to provide a method and apparatus for producing a thermoplastic resin film, which can sustain a high cooling efficiency and can inhibit the precipitation and deposition of the oligomer onto the spray nozzles, inter-nozzle exhaust mechanism, etc.

Means for Solving the Problem

The inventors completed the present invention by elaborately combining the design of an auxiliary cooling device used for cooling and solidifying a molten thermoplastic resin and the setting of process conditions including the indoor environment preferred at the time of production. In order to solve the problem of the prior art, this invention employs an apparatus provided with spray nozzles and a suction/discharge mechanism used when a molten thermoplastic resin is cast from an extrusion die onto a cooling drum, in which the film surface not in contact with the cooling drum (hereinafter referred to as the anti-cooling drum-side surface) is cooled, while the air near the film is sucked, wherein the requirements are achieved by the means of optimizing both the balance between the amount of sprayed air and the amount of sucked/discharged air and the balance between the air supply and the air exhaust in the entire chamber containing the cooling drum and the auxiliary cooling device.

The aforementioned problem of this invention can be solved by the following achieving means. One version of the invention is an apparatus for producing a thermoplastic resin film, in which when a molten thermoplastic resin is cast from an extrusion die onto a cooling drum, to be cooled and solidified on the cooling drum, for producing a thermoplastic resin film, air is sprayed by spray nozzles toward the film on the side of the film surface not in contact with the cooling drum (hereinafter referred to as the anti-cooling drum-side surface), while the air near the film is sucked by an inter-nozzle exhaust mechanism simultaneously on the side of the anti-cooling drum-side surface, wherein the suction faces of the inter-nozzle exhaust mechanism are installed at positions recessed from the tip faces of the spray nozzles in the direction farther away from the film. Another version of the invention is a method for producing a thermoplastic resin film by casting a molten thermoplastic resin from an extrusion die onto a cooling drum, to cool and solidify on the cooling drum, for producing a thermoplastic resin film, which comprises the step of spraying air toward the film on the side of the film surface not in contact with the cooling drum (hereinafter referred to as the anti-cooling drum-side surface) while simultaneously sucking the air near the film on the side of the anti-cooling drum-side surface, wherein if the total amount of the air sprayed per unit time is S, and the total amount of the air sucked per unit time is E, then S is larger than or equal to E.

Effect of the Invention

In the method for producing a thermoplastic resin film of this invention, by keeping the amount of the air sprayed by the cooling device on the side of the anti-cooling drum-side surface larger than the sucked amount, in order to prevent the air with a high oligomer concentration in the proximity of the extrusion die from being sucked into the cooling device, it can be prevented that the oligomer is precipitated and deposited on the spray nozzles and the suction faces of the inter-nozzle exhaust mechanism in the cooling device. (In this description, the apparatus of the present invention may be called the cooling device as the case may be.) As a result, the foreign matter defects caused by the oligomer can be reduced, and the production yield decline and the cleaning loss caused by the foreign matter defects can be significantly reduced. Further, the suction/discharge mechanism is installed at a position recessed from the tip faces of the spray nozzles in the direction farther away from the film, and consequently even if the oligomer is precipitated on the suction faces more or less, the oligomer is unlikely to fall and be deposited on the film surface.

Further, the spray nozzles are not required to have heating means such as heaters and the cooling efficiency of the spray nozzles can be assured. Crystallization defects are also unlikely to occur.

On the other hand, an exhaust mechanism is installed on the side of the anti-cooling drum-side surface and in the proximity of the extrusion die, so that the air exhaust may be excessive in the balance between air supply and air exhaust in the chamber as a whole, and so that the air with a high oligomer concentration in the proximity of the aforementioned extrusion die may be discharged while simultaneously the air sprayed from the first spray nozzle of the cooling device and blown up in the extrusion die direction may be discharged. With this configuration, the cleanness in the chamber as a whole can be secured, and at the same time the instability at the landing site of the molten thermoplastic resin right under the extrusion die caused by the blowup of the sprayed air can also be improved.

Therefore, both the troubles of foreign matters and crystallization defects on the surface of a thick film with a thickness of more than about 150 μm caused by the oligomer, which were difficult to solve by conventional production techniques can be solved by the film obtained in this invention, and the film can be mainly used in connection with displays, more particularly, is suitable as a light diffusion layer of a diffusion plate, a prism layer of a prism sheet, a reflection preventive layer of a reflection preventive film, and a substrate of an optically functional film used for processing a polarizing plate.

MODES FOR CARRYING OUT THE INVENTION

The thermoplastic resin film obtained by the method for producing a thermoplastic resin film of this invention is made of, for example, a polyester such as polyethylene terephthalate (hereinafter may be abbreviated as PET), acrylic polymer or polycarbonate (hereinafter may be abbreviated as PC).

Figure 2:
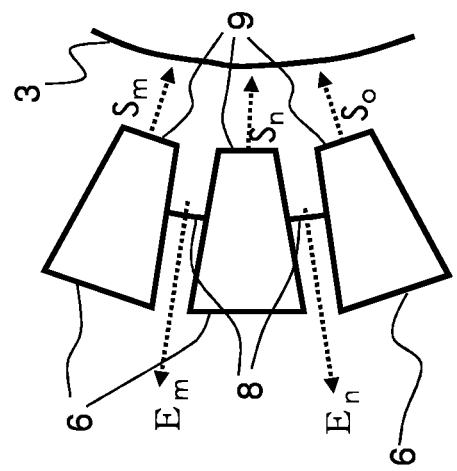
FIG. 2 is an expanded view of the spray nozzles of FIG. 1.
Figure 1:
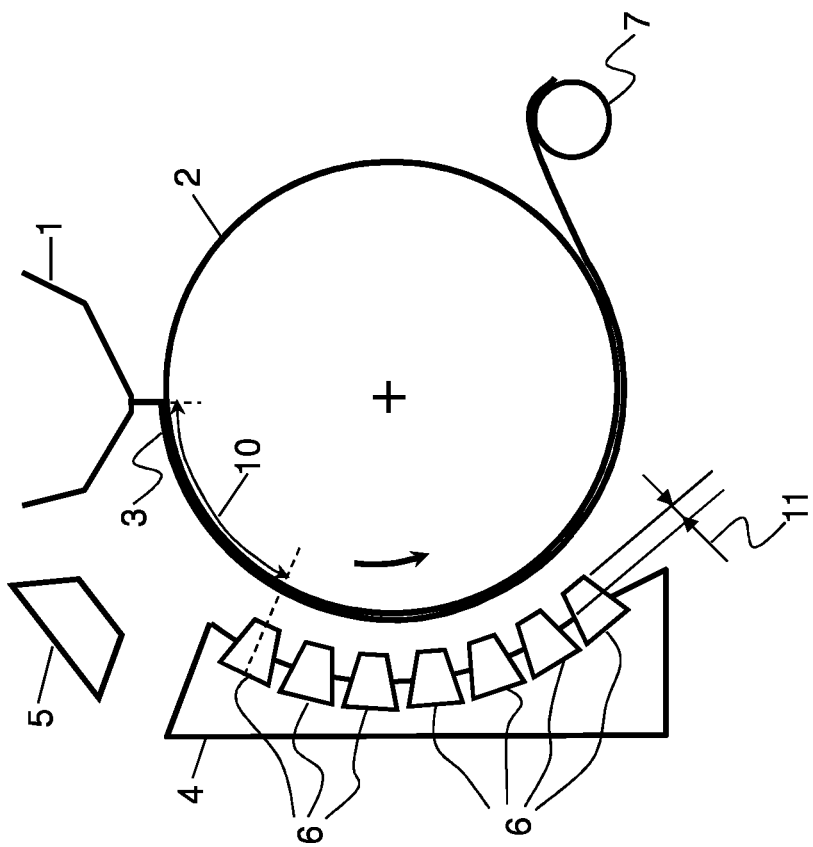
FIG. 1 is a schematic side view of an apparatus for producing a thermoplastic resin film of this invention.

In the method for producing a thermoplastic resin film of this invention, as shown in the schematic side view of FIG. 1 and in FIG. 2 as a partial expanded view of FIG. 1 respectively, for example, an extrusion die (1) and a cooling drum (2) right thereunder are provided, and as a cooling device for the anti-cooling drum-side surface, spray nozzles (6) are disposed in the circumferential direction of the cooling drum (2) in such a manner as to spray air toward the center of the cooling drum (2). Further, there is an inter-nozzle exhaust mechanism (4) for sucking air through the clearances between the respective spray nozzles. Furthermore, an extrusion die's proximity exhaust mechanism (5) may be installed on the upstream side of the extrusion die (on the side where the molten thermoplastic resin is cast) and above the inter-nozzle exhaust mechanism as the case may be.

The apparatus of this invention has two or more multiple spray nozzles (6) for spraying air toward the anti-cooling drum-side surface of a thermoplastic resin film (3) when a molten thermoplastic resin is cast from the extrusion die (1) to form the film with a thickness of approx. 1 to approx. 5 mm on the cooling drum (2), to be cooled and solidified (the total amount of the air from the multiple spray nozzles per unit time is S; if the amounts of air sprayed from the respective multiple spray nozzles per unit time are, for example, Sm, Sn and So from the highest spray nozzle, then we have S=Sm+Sn+So). Further, portions of the inter-nozzle exhaust mechanism (4) for sucking the air near the film are disposed between the respective spray nozzles (the total amount of the air sucked by the inter-nozzle exhaust mechanism (4) per unit time is E; if the amounts of the air sucked through the clearances between the multiple spray nozzles are Em and En from the highest clearance, then we have E=Em+En). In the apparatus of this invention or in the production method of this invention, the amount of sprayed air (S) is made larger than or equal to the amount of sucked air E (S>E), to ensure that the air with a high oligomer concentration in the proximity of the extrusion die cannot exist in the space between the spray nozzles on one hand and the cooling drum on the other hand as far as possible.

In the production method of this invention, the amount of sucked air (E) is preferably in a range from 25 to 150 m³/min, more preferably 40 to 80 m³/min. Further, the amount of sprayed air (S) is preferably in a range from 50 to 150 m³/min, more preferably 70 to 100 m³/min. Furthermore, in the relation between the amount of sucked air (E) and the amount of sprayed air (S), the amount of sprayed air (S) is made larger than or equal to the amount of sucked air (E), and the ratio E/S is preferably in a range from 0.5 to 1.0, more preferably 0.5 to 0.9. In the case where the ratio is larger than 1.0, an air stream for sucking highly concentrated oligomer air in the proximity of the extrusion die is formed between the cooling device and the cooling drum. Further, if the ratio is smaller than 0.5, blowup becomes large, and before the thermoplastic resin extruded from the extrusion die lands on the cooling drum, it may vibrate to cause thickness fluctuation as the case may be.

Further, in the apparatus or production method of this invention, it is desirable to use another exhaust mechanism as indicated by (5) in FIG. 1 for sucking and discharging the highly concentrated oligomer air stagnating in the proximity of the extrusion die. It is preferred that the installation position of the extrusion die's proximity exhaust mechanism is on the side of the anti-cooling drum-side surface of the film such as the ceiling of the casting chamber and above the cooling drum. On the other hand, it can also be considered to install an exhaust mechanism in the extrusion die per se, but if the suction faces of the exhaust mechanism are installed in the extrusion die, the molten thermoplastic resin film is likely to vibrate, and since the exhaust amount must be kept as small as possible, the effect of decreasing the oligomer concentration cannot be expected.

In the spray nozzles and the inter-nozzle exhaust mechanism of the apparatus of this invention, for example, the spray nozzles and the suction faces of the inter-nozzle exhaust mechanism respectively extending in the transverse direction of the cooling drum are alternately disposed along the rotating direction of the cooling drum, and the inter-nozzle exhaust mechanism exists as multiple shielding plates having exhaust holes. For example, for a cooling drum with a diameter of 1,000 to 1,600 mm and a width of 1,000 to 1,600 mm, it is preferred that 5 to 15 spray nozzles having slit-like tips with clearances of 2 to 10 mm are installed at a pitch of 100 to 150 mm in the circumferential direction. If the number of spray nozzles is less than 5, the region of the film with a high crystallization rate cannot be fully cooled, and crystallization defects may be caused. If the number of spray nozzles is larger than 15, supercooling occurs in the spray nozzle portions, to lower the temperature of the film delivered from the cooling drum, and in the subsequent steps, for example, in longitudinal stretching, stretching fluctuation may be induced. Further, it is preferred that the width of the spray nozzles is wider than the width of the thermoplastic resin film on the cooling drum by 100 to 500 mm. Furthermore, it is preferred that the distance between the tip faces of the spray nozzles and the surface of the thermoplastic resin film is 5 to 30 mm. If the distance between the tip faces of the spray nozzles and the film is shorter than 5 mm, the film surface is likely to be deformed by the sprayed air, and the oligomer is liable to be deposited on the film surface. If the distance is longer than 30 mm, the cooling efficiency of sprayed air declines, and crystallization defects may be caused.

It is preferred that the position of the first spray nozzle is a position corresponding to a length (10) of 500 mm or more from right above the apex of the cooling drum along the rotating direction of the cooling drum toward the landing site of the air sprayed by the first spray nozzle. A more preferred installation position is 1,000 mm or more apart from right above the apex. If the position is shorter than 500 mm, the molten thermoplastic resin film flowing from the extrusion die swings to raise the problem of causing the surface fluctuation of the film.

On the other hand, it is preferred that the holes of the suction faces of the inter-nozzle exhaust mechanism are such that the diameter of each hole is 4 to 10 mm and that the number of rows per each suction face is 5 to 10. If the diameter of each hole is smaller than 4 mm while the number of rows is larger than 10, the pressure loss around each hole during suction becomes high, and exhaust air cannot be fully sucked, the oligomer being likely to be deposited. Meanwhile, the width of the suction faces is recommended to be adapted to the width of the spray nozzles.

In the case where the spray nozzles and the suction faces of the inter-nozzle exhaust mechanism are disposed alternately, it is preferred that a spray nozzle is disposed at the highest stage. If a suction face is disposed at the highest stage, the oligomer is liable to be precipitated and deposited on the suction face, to fall on the film surface, being likely to cause foreign matter defects.

Further, if the surface material of the aforementioned spray nozzles and the aforementioned exhaust mechanism is contrived, the deposition of the oligomer generated from the film can be more effectively prevented. For example, as treatment for preventing the precipitation of the oligomer on the tip faces of the spray nozzles and the suction faces of the inter-nozzle exhaust mechanism, it is recommended to apply a material with low surface friction, for example, diamond coating (DLC). Further, more preferably fluorine resin coating or fluorine-based resin tape sticking can be inexpensively and easily applied to the surfaces. With this treatment, the oligomer generated from the film and suspended in the air near the film can be inhibited from being precipitated and deposited on the air supply means and the exhaust means, and can be efficiently discharged outside together with the air near the film.

As the tip face of each spray nozzle, slit type in which a slit-like opening having a certain clearance is disposed in the transverse direction, perforated plate type having multiple circular holes, and the like can be preferably given as examples. It is known that the cooling efficiency of a spray nozzle of perforated plate type is generally higher than that of slit type, if the opening area at the tip face of the spray nozzle, the sprayed air velocity and temperature remain identical (for example, patent document 4), and perforated plate type has a larger effect of preventing crystallization defects. However, for example, in the case where the surface of a transparent optical film is cooled by perforated plate type spray nozzles, if the diameter of the holes and the intervals between holes are too large, cooling fluctuation may be caused. The cooling fluctuation may result in film thickness fluctuation or brightness fluctuation of the processed article, etc. Therefore, in the case where perforated plate type spray nozzles are used, it is necessary to design the diameter of holes, the intervals between holes, the number of hole rows, the intervals between hole rows, etc. lest cooling fluctuation should occur.

For example, if the intervals between holes and the intervals between hole rows are short, the jets of spray nozzles are likely to interfere with each other or are likely to vary, lowering the cooling efficiency and causing cooling fluctuation, etc. Further, if the number of hole rows is increased and the intervals between hole rows are made longer, the tip faces of the spray nozzles (the nozzle faces close to the cooling drum) become large in area, and the oligomer is likely to be precipitated and deposited. Therefore, it is preferred to design the tip faces of the spray nozzles in such a manner as to make the tip faces of the spray nozzles as smaller in area as possible, considering the cooling efficiency. Specifically in the case of perforated plate type spray nozzles, it is preferred that the diameter of holes is 2 to 10 mm and that the number of rows per spray nozzle is 2 to 6.

The selection of perforated plate type or slit type for the spray nozzles can be decided considering various conditions in reference to the crystallization properties of the thermoplastic resin, the specifications of the cooling drum, desired cooling air intensity and cooling degree. For example, in the cooling device comprising multiple spray nozzles, it is recommended to install a slit nozzle at the highest stage as an air curtain for inhibiting the suction of air from the proximity of the extrusion die, and to install perforated plate type spray nozzles in the temperature range where the crystallization rate is high, for enhancing the cooling efficiency.

As the suction faces of the inter-nozzle exhaust mechanism, multiple shieling plates having holes are used to suck the air near the film through the exhaust holes without allowing the air near the film to stagnate, and the oligomer generated from the film and suspended in the air near the film can be sucked quickly through the exhaust holes, to be discharged outside. However, after use for a long period of time, the oligomer may be precipitated and deposited on the suction faces, for example, on the edges of the exhaust holes, etc., and the oligomer may fall and be deposited on the film surface owing to the sprayed air, to make foreign matter defects. Therefore, as shown in FIG. 2, it is recommended to install the suction faces (8) of the inter-nozzle exhaust mechanism at positions recessed from the tip faces (9) of the spray nozzles in the direction farther away from the cooling drum. Further, the distance between the suction faces of the inter-nozzle exhaust mechanism and the tip faces of the spray nozzles is preferably 100 mm or more, and in this configuration even in the case where the oligomer is precipitated in the exhaust mechanism, the oligomer is unlikely to fall on the film.

Figure 3:
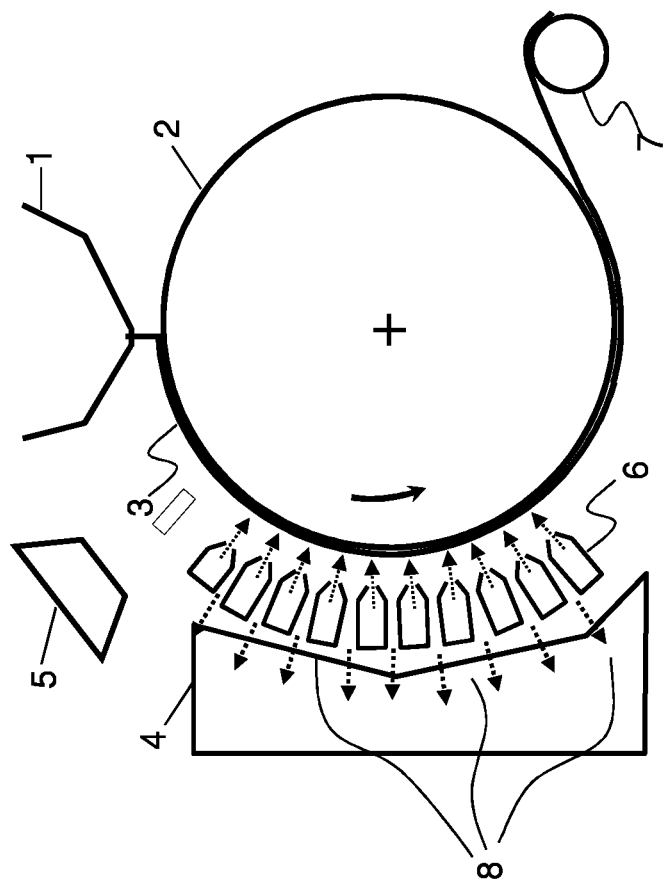
FIG. 3 is a schematic side view of the best inter-nozzle exhaust mechanism position of this invention.

Preferably as shown in FIG. 3, it is recommended that the inter-nozzle exhaust mechanism (4) is perfectly separated from the spray nozzles (6) and installed behind the rear faces of the spray nozzles, and that through openings are formed between the respective spray nozzles. In this case, the air sprayed to and rebounded from the film surface passes through the through openings between the respective spray nozzles, and is sucked by the exhaust mechanism behind the rear faces of the nozzles. In this case, being "perfectly separated" means that none of the spray nozzles is kept in contact with the suction face as shown in FIG. 3, and on the other hand, FIG. 1 shows an example in which the spray nozzles (6) are not separated from the inter-nozzle exhaust mechanism (4). Mere separation refers to a case where at least one of the spray nozzles of FIG. 1 does not contact the suction face like the spray nozzles of FIG. 3.

In the case where the blown-up air velocity at the highest stage is large, there arises the problem that thickness fluctuation occurs in the film since the thermoplastic resin discharged from the extrusion die vibrates as in the case where the exhaust mechanism is made too close. Therefore, it is preferred that the spray nozzle nearest to the extrusion die, that is, the spray nozzle at the highest stage allows the spray angle to the film surface to be freely adjusted. If such a mechanism is provided, the suction and the blowup rate can be controlled. That is, if the spray nozzle at the highest stage is inclined in the rotating direction of the cooling drum, the sprayed air serves as a curtain, giving an effect of inhibiting the blowup. Specifically the inclination angle of the spray nozzle at the highest stage is preferably 0 to 20° with respect to the rotating direction of the cooling drum, and if the nozzle is inclined more than the range, the cooling efficiency at the highest stage declines.

EXAMPLES

At first, the methods for evaluating the films obtained by the film production method of the present invention are explained below.

(1) Film Thickness Fluctuation

From a film sample with a length of 1 m and a width of 600 mm, three specimens with a width of 40 mm for thickness measurement were obtained by cutting in such a manner that the central portion in the width direction of the film, sample and 100 mm positions from the edges might be the centers of the specimens. Then, the thicknesses of each specimen were continuously measured in the longitudinal direction and outputted to a chart recorder. From the profile of outputted thicknesses, the difference between the maximum value (MAX) and the minimum value (MIN) of thicknesses was identified as the thickness fluctuation (R) (=MAX−MIN). As the thickness fluctuation (R), the values of the three specimens were averaged.

(2) Foreign Matter Defects on the Surface

A film sample with a length of 1 m and a width of 600 mm was hung down in the vertical direction in a darkroom, and a lusterless black cloth was arranged behind the entire back surface of the film. While an oriented film was unwound, the front surface (the covering layer surface) was irradiated with a bromine light, the angle of the bromine light was changed in a range from approx. 10° to approx. 45° with respect to the film surface, and in this state, the front surface of the film was observed. Foreign matter defects of 0.5 mm in major axis were marked, and the number of defects per film area of 1 $m^2$ was counted. In this case, Kimwipe (registered trademark) impregnated with methyl ethyl ketone was used to lightly wipe the defect portions, and when any defect portion did not vanish, it was confirmed that the defect was not a foreign matter originating from the covering layer. Meanwhile, since foreign matter defects on the surface increase with the lapse of film production time, a film sample obtained after the cooling device was used continuously for 24 hours was observed on the anti-cooling drum-side surface.

(3) Crystallization Defects

A film sample with a length of 1 mm and a width of 600 mm was hung down in the vertical direction in a darkroom, and the anti-cooling drum-side surface was irradiated with a three-wavelength fluorescent lamp (Palook three-wavelength type neutral (F. L 15EXO-N 15W) produced by Panasonic Corporation) used as a light projector for reflection, and defects of more than 10 mm were marked. The marked defects were measured by an optical microscope (400× magnification), and a shape having multiple projections concentrated to have a major axis of more than 10 mm was counted as a crystallization defect.

(4) Measurement of Haze

On the basis of JIS K 7105 (1981), a haze meter ("NDH2000") produced by Nippon Denshoku Industries Co., Ltd. was used for measurement. On a film sample with a length of 1 m and a width of 600 mm, measurement was made in the forty five 100 mm squares in total obtained by establishing 9 squares lengthwise and 5 squares crosswise in such a manner that no adjacent squares might not be overlapped on each other and that every two adjacent squares might share one side, and the values were averaged.

(5) Oligomer Concentration in Spray Nozzle Portions

For the cooling device, a SUS plate coated with Teflon (registered trademark) with a length of 50 mm and a width of 50 mm was attached to the surface of the first spray nozzle (near the central portion in the transverse direction of the film). After the cooling device was continuously used for 24 hours, the SUS plate was removed from the spray nozzle, and the oligomer precipitated and deposited on the surface was washed in methanol. The filtrate was set in a spectrophotometer, and the absorbance at a wavelength of 240 nm was measured.

For determining the oligomer amount, a calibration curve between absorbance (240 nm) and oligomer concentration (ppm) was prepared in advance, and the oligomer concentration was estimated from the absorbance.

(6) Air Stream Around the Cooling Device

The hose of a pure water mist stream visualization device (CLEAN VIEWER ACV-501 produced by AIRTECK JAPAN, LTD.) was directed near the first spray nozzle of the cooling device and right under the extrusion die (near the apex of the cooling drum), and the flow of the white mist from the visualization device was visually observed. The intensity and direction of the air near the cooling device were evaluated as described below.

Evaluation A: The air near the spray nozzle was energetically blown toward right under the extrusion die. The thermoplastic resin discharged from the extrusion die was vibrated by air, and in addition, the air from the spray nozzle hit the film obliquely, to lower the cooling efficiency unpreferably.

Evaluation B: The air near the spray nozzle was blown toward the extrusion die, but did not reach just under the extrusion die. The air from the spray nozzle hit the film rather obliquely to somewhat lower the cooling efficiency, but the oligomer near the die did not flow into the cooling device preferably.

Evaluation C: The air near the spray nozzle remained almost stagnant and motionless or was repeatedly sucked and blown out. The air from the spray nozzle hit the film straight, to assure high cooling efficiency and the oligomer near the die did not flow into the cooling device most preferably.

Evaluation D: The air near the spray nozzle was gently sucked in the rotating direction of the cooling drum. The air from the spray nozzle hit the film rather obliquely, to somewhat lower the cooling efficiency, and in addition, the air with a high oligomer concentration near the die flowed into the cooling device unpreferably.

Evaluation E: The air near the spray nozzle was energetically sucked in the rotation direction of the cooling drum. The air from the spray nozzle hit the film obliquely to lower the cooling efficiency, and in addition, the air with a high oligomer concentration near the die flowed into the cooling device unpreferably.

(7) Cleanness of Casting Chamber

The cleanness in the casting chamber was measured using a particle counter. The cleanness was measured at two positions: the position just above the cooling drum and the position just above the spray nozzle at the highest stage of the cooling device. The mean value of the measured values was employed as the cleanness indicator. With regard to the suitability for optical use, a film in conformity with all the conditions of five foreign matter defects or less on the surface per square meter, five crystallization defects or less per square meter, and thickness fluctuation R of 10 μm or less was decided to be acceptable.

The film forming conditions in the film production method of this invention are explained below. Meanwhile, the cooling device conditions of Examples 1 to 6 and Comparative Examples 1 to 6 are shown in Table 1, and the cooling step conditions are shown in Table 2. The properties of the films obtained under the conditions of the examples and the comparative examples are shown in Table 3.

Example 1

As the raw material of the polyester, pellets of polyethylene terephthalate resin (F20S produced by Toray Industries, Inc.) were dried under reduced pressure, supplied into an extruder, and melt-extruded at 280° C. It was brought into contact with a cooling drum (diameter 1,600 mm) kept at a surface temperature of 20° C. by an electrostatic application method, and simultaneously cooled and solidified using a cooling device, to obtain a thermoplastic resin film with a thickness of 2,100 µm.

The cooling device had a first spray nozzle disposed in the portion nearest to the extrusion die from which the thermoplastic resin was extruded, and the inter-nozzle exhaust mechanism was perfectly separated from the spray nozzles and installed apart from the rear faces of the spray nozzles by 50 mm. Therefore, the suction face of the inter-nozzle exhaust mechanism was perfectly apart from the tip faces of the spray nozzles, and there were through openings between the respective spray nozzles.

Fifteen spray nozzles were installed at a pitch of 100 mm along the rotating direction of the cooling drum, and there were through openings between the respective spray nozzles, which allowed the passing of the air rebounded from the film.

Further, the portions from which the air was sprayed were of slit type, each slit having a clearance of 2 mm and a width of 1,400 mm.

Further, for the suction face of the inter-nozzle exhaust mechanism, a blind type shielding plate was installed, and the opening could be adjusted to make the exhaust amount variable. The length of the cooling drum from just above the apex of the cooling drum along the rotating direction of the cooling drum to the landing site of the air sprayed from the first spray nozzle was 1,400 mm. The cooling and solidifying step conditions were 8 m/min as the cooling drum rotating speed, 90 m$^3$/min as the total amount of sprayed air, 70 m$^3$/min as the total amount of air sucked by the inter-nozzle exhaust mechanism, and 11° C. as the cooling air temperature.

The cooling drum and the cooling device were installed in one chamber partitioned by a cover and the like (hereinafter called the casting chamber) and had a 5 m square floor and a 5 m high ceiling, hence a capacity of 125 m$^3$. In the casting chamber, an extrusion die's proximity exhaust mechanism was installed under the ceiling, and the ventilation frequency was 80 times/hr, the cleanness in the chamber being class 1,000.

The thermoplastic resin film was heated by heated rolls and an infrared heater and subsequently stretched to 3.2 times in the machine direction by rolls with a peripheral speed difference, to obtain a monoaxially oriented polyester film. In succession the film was held at the edges by clips, being introduced into a hot air zone with a temperature of 130° C., and stretched in the transverse direction of the film to 3.5 times. Then, with the stretched width maintained, the film was heat-set in a hot air zone with a temperature of 220° C., treated by cooling in a hot air zone with a temperature of 100° C., then trimmed at both the edges of the film, and further wound by a winder, to obtain a biaxially oriented polyester film with a thickness of 188 µm and a width of 3,450 mm. From the obtained biaxially oriented polyester film, both the edges of 150 mm each were removed, and the remaining film was slit into three parts each with a width of 1,000, to obtain three polyester film rolls each with a width of 1,000 mm and a length of 2,000 m. Among the three rolls, the central roll was used to prepare film roll samples necessary for evaluating thickness fluctuation, surface foreign matters, crystallization defects, etc.

Example 2

Used was a cooling device having the suction faces of an inter-nozzle exhaust mechanism placed between the respective spray nozzles, in which the distance between the tip faces of the spray nozzles and the suction faces of the inter-nozzle exhaust mechanism was set at 100 mm. Therefore, the inter-nozzle exhaust mechanism was not separated from the spray nozzles, and there were no through openings between the respective spray nozzles. Except this configuration, polyester films rolls with a film thickness of 188 µm, a width of 1,000 mm and a length of 2,000 m were obtained as described in Example 1.

Example 3

In the cooling step conditions, the total amount of sprayed air was 120 m$^3$/min and the total amount of sucked air was 70 m$^3$/min; hence total amount of sucked air/total amount of sprayed air=0.58. Further, the inter-nozzle exhaust mechanism was separated from the spray nozzles and installed behind the rear faces of the spray nozzles, and through openings were formed between the respective spray nozzles. Thus, polyester film rolls with a film thickness of 188 µm, a width of 1,000 mm and a length of 2,000 were obtained.

Example 4

In the cooling step conditions, the cooling air temperature was set at 15° C. Further, the inter-nozzle exhaust mechanism was separated from the spray nozzles and installed behind the rear faces of the spray nozzles, and through openings were formed between the respective spray nozzles. Except this configuration, polyester film rolls with a film thickness of 188 µm, a width of 1,000 mm and a length of 2,000 m were obtained as described in Example 1.

Example 5

Polyester film rolls with a film thickness of 188 µm, a width of 1,000 mm and a length of 2,000 m were obtained under the same conditions as those of Example 1, except that no ceiling exhaust mechanism was installed in the cooling step conditions. Meanwhile the cleanness in the casting chamber was class 3,000.

Example 6

In the cooling step conditions, the total amount of sprayed air was 90 m$^3$/min and the total amount of sucked air was 90 m$^3$/min; hence total amount of sucked air/total amount of sprayed air=1.00. Further, the inter-nozzle exhaust mechanism was separated from the spray nozzles and installed behind the rear faces of the spray nozzles, and through openings were formed between the respective spray nozzles. Except this configuration, polyester film rolls with a film thickness of 188 µM, a width of 1,000 mm and a length of 2,000 m were obtained as described in Example 1.

Example 7

In the cooling step conditions, the total amount of sprayed air was 90 m$^3$/min and the total amount of sucked air was 45 m³/min; hence total amount of sucked air/total amount of sprayed air=0.50. Further, no ceiling exhaust mechanism was installed. Furthermore, the inter-nozzle exhaust mechanism was separated from the spray nozzles and installed behind the rear faces of the spray nozzles, and through openings were formed between the respective spray nozzles. Except this configuration, polyester film rolls with a film thickness of 188 μm, a width of 1,000 mm and a length of 2,000 m were obtained as described in Example 1.

Example 8

In the cooling step conditions, the total amount of sprayed air was 90 m³/min and the total amount of sucked air was 81 m³/min; hence total amount of sucked air/total amount of sprayed air=0.90. Further, no ceiling exhaust mechanism was installed. Furthermore, the inter-nozzle exhaust mechanism was separated from the spray nozzles and installed behind the rear faces of the spray nozzles, and through openings were formed between the respective spray nozzles. Except this configuration, polyester film rolls with a film thickness of 188 μm, a width of 1,000 mm and a length of 2,000 m were obtained as described in Example 1.

Comparative Example 1

In the cooling device, a suction face was disposed in the portion closest to the extrusion die and the suction faces of the inter-nozzle exhaust mechanism were disposed between the respective spray nozzles. Further, the tip faces of the spray nozzles and the suction faces of the inter-nozzle exhaust mechanism were disposed on the same circumference. Therefore, no through openings were formed between the respective spray nozzles. Further, as a measure for preventing the precipitation of the oligomer on the suction faces, heaters were arranged on the wall faces inside the suction faces. Furthermore, the length of the cooling drum from just above the apex of the cooling drum along the rotating direction of the cooling drum to the landing site of the air sprayed from the first spray nozzle was set at 1,400 mm. Moreover, the total amount of sprayed air was 90 m³/min and the total amount of sucked air was 340 m³/min; hence total amount of sucked air/total amount of sprayed air=3.78. Except this configuration, polyester film rolls with a film thickness of 188 μm, a width of 1,000 mm and a length of 2,000 m were obtained as described in Example 1.

Comparative Example 2

Polyester film rolls with a film thickness of 188 μm, a width of 1,000 mm and a length of 2,000 m were obtained as described in Comparative Example 1, except that the total amount of sprayed air was 90 m³/min while the total amount of sucked air was 225 m³/min; hence total amount of sucked air/total amount of sprayed air=2.50.

Comparative Example 3

Polyester film rolls with a film thickness of 188 μm, a width of 1,000 mm and a length of 2,000 m were obtained as described in Comparative Example 1, except that the ventilation frequency in the casting chamber was 120 times/hr. Meanwhile, the cleanness in the casting chamber was class 800.

Comparative Example 4

Polyester film rolls with a film thickness of 188 μm, a width of 1,000 mm and a length of 2,000 m were obtained as described in Comparative Example 1, except that the distance between the tip faces of the spray nozzles to the suction faces of the inter-nozzle exhaust mechanism was 100 mm.

Comparative Example 5

The first spray nozzle was installed in the portion nearest to the extrusion die. Further, no heater was installed inside the first suction face. Except these conditions, polyester film rolls with a film thickness of 188 μm, a width of 1,000 mm and a length of 2,000 m were obtained as described in Comparative Example 1.

Comparative Example 6

The first spray nozzle was installed in the portion nearest to the extrusion die. Further, no heater was installed inside the first suction face. Furthermore, the suction faces of the inter-nozzle exhaust mechanism were apart from the tip faces of the spray nozzles. Except these conditions, polyester film rolls with a film thickness of 188 μm, a width of 1,000 mm and a length of 2,000 m were obtained as described in Comparative Example 1.

Comparative Example 7

The first spray nozzle was installed in the portion nearest to the extrusion die. Further no heater was installed inside the first suction face. Furthermore, the distance from the tip faces of the spray nozzles to the suction faces of the inter-nozzle exhaust mechanism was 100 mm. Except these conditions, polyester film rolls with a film thickness of 188 μm, a width of 1,000 mm and a length of 2,000 m were obtained as described in Comparative Example 1.

TABLE 1

| | Portion nearest to the extrusion die (suction face or spray nozzle) | Measure inside the suction face for preventing the oligomer | Position of inter-nozzle exhaust mechanism | Whether or not through openings are formed | Distance between the suction faces of the exhaust mechanism and the tip faces of the spray |
|---|---|---|---|---|---|
| Example 1 | Spray nozzle | None | Behind the rear faces of nozzles (perfectly separated from spray nozzles) | Formed | 250 |
| Example 2 | Spray nozzle | None | Between nozzles | Not formed | 100 |
| Example 3 | Spray nozzle | None | Behind the rear faces of nozzles (perfectly separated from spray nozzles) | Formed | 250 |
| Example 4 | Spray nozzle | None | Behind the rear faces of nozzles (perfectly separated from spray nozzles) | Formed | 250 |
| Example 5 | Spray nozzle | None | Behind the rear faces of nozzles (perfectly separated from spray nozzles) | Formed | 250 |
| Example 6 | Spray nozzle | None | Behind the rear faces of nozzles (perfectly separated from spray nozzles) | Formed | 250 |

TABLE 1-continued

|  | Portion nearest to the extrusion die (suction face or spray nozzle) | Measure inside the suction face for preventing the oligomer | Position of inter-nozzle exhaust mechanism | Whether or not through openings are formed | Distance between the suction faces of the exhaust mechanism and the tip faces of the spray |
|---|---|---|---|---|---|
| Example 7 | Spray nozzle | None | Behind the rear faces of nozzles (perfectly separated from spray nozzles) | Formed | 250 |
| Example 8 | Spray nozzle | None | Behind the rear faces of nozzles (perfectly separated from spray nozzles) | Formed | 250 |
| Comparative Example 1 | Suction face | Heater | Between nozzles | Not formed | 0 |
| Comparative Example 2 | Suction face | Heater | Between nozzles | Not formed | 0 |
| Comparative Example 3 | Suction face | Heater | Between nozzles | Not formed | 0 |
| Comparative Example 4 | Suction face | Heater | Between nozzles | Not formed | 100 |
| Comparative Example 5 | Spray nozzle | None | Between nozzles | Not formed | 0 |
| Comparative Example 6 | Spray nozzle | None | Behind the rear faces of nozzles (perfectly separated from spray nozzles) | Formed | 250 |
| Comparative Example 7 | Spray nozzle | None | Between nozzles | Not formed | 100 |

TABLE 2

|  | Total amount of sprayed air ($m^3$/min) | Total amount of sucked air ($m^3$/min) | Total amount of sucked air (E)/ Total amount of sprayed air (S) | Cooling air temperature (° C.) | Air flow around auxiliary cooling device | Chamber ventilation frequency (times/hr) | Cleanness in the chamber | Ceiling exhaust mechanism |
|---|---|---|---|---|---|---|---|---|
| Example 1 | 90 | 70 | 0.78 | 11 | Evaluation C | 80 | Class 1000 | Provided |
| Example 2 | 90 | 70 | 0.78 | 11 | Evaluation B | 80 | Class 1000 | Provided |
| Example 3 | 120 | 70 | 0.58 | 11 | Evaluation B | 80 | Class 1000 | Provided |
| Example 4 | 90 | 70 | 0.78 | 15 | Evaluation C | 80 | Class 1000 | Provided |
| Example 5 | 90 | 70 | 0.78 | 11 | Evaluation C | — | Class 1000 | Not provided |
| Example 6 | 90 | 90 | 1.00 | 11 | Evaluation C | 80 | Class 1000 | Provided |
| Example 7 | 90 | 45 | 0.50 | 11 | Evaluation B | 80 | Class 1000 | Not provided |
| Example 8 | 90 | 81 | 0.90 | 11 | Evaluation C | 80 | Class 1000 | Not provided |
| Comparative Example 1 | 90 | 340 | 3.78 | 11 | Evaluation E | 80 | Class 1000 | Provided |
| Comparative Example 2 | 90 | 225 | 2.50 | 11 | Evaluation D | 80 | Class 1000 | Provided |
| Comparative Example 3 | 90 | 340 | 3.78 | 11 | Evaluation E | 120 | Class 1000 | Provided |
| Comparative Example 4 | 90 | 340 | 3.78 | 11 | Evaluation E | 80 | Class 1000 | Provided |
| Comparative Example 5 | 90 | 340 | 3.78 | 11 | Evaluation E | 80 | Class 1000 | Provided |
| Comparative Example 6 | 90 | 340 | 3.78 | 11 | Evaluation E | 80 | Class 1000 | Provided |
| Comparative Example 7 | 90 | 340 | 3.78 | 11 | Evaluation E | 80 | Class 1000 | Provided |

TABLE 3

|  | Film thickness after stretching (μm) | Thickness fluctuation (μm) | Foreign matter defects on the surface (pcs/$m^2$) | Crystallization defects (pcs/$m^2$) | Haze (%) | Suitability for optical use |
|---|---|---|---|---|---|---|
| Example 1 | 188 | 5 | 2 | 0 | 1.2 | Accepted |
| Example 2 | 188 | 5 | 4 | 3 | 1.2 | Accepted |
| Example 3 | 188 | 8 | 2 | 3 | 1.3 | Accepted |
| Example 4 | 188 | 5 | 2 | 4 | 1.4 | Accepted |
| Example 5 | 188 | 5 | 4 | 0 | 1.3 | Accepted |
| Example 6 | 188 | 6 | 3 | 0 | 1.2 | Accepted |
| Example 7 | 188 | 9 | 1 | 1 | 1.2 | Accepted |
| Example 8 | 188 | 5 | 3 | 0 | 1.3 | Accepted |
| Comparative Example 1 | 188 | 6 | 15 | 14 | 1.7 | Rejected |
| Comparative Example 2 | 188 | 7 | 11 | 11 | 1.5 | Rejected |
| Comparative Example 3 | 188 | 6 | 12 | 13 | 1.6 | Rejected |

TABLE 3-continued

|  | Film thickness after stretching (μm) | Thickness fluctuation (μm) | Foreign matter defects on the surface (pcs/m$^2$) | Crystallization defects (pcs/m$^2$) | Haze (%) | Suitability for optical use |
|---|---|---|---|---|---|---|
| Comparative Example 4 | 188 | 6 | 10 | 15 | 1.7 | Rejected |
| Comparative Example 5 | 188 | 6 | 20 | 15 | 1.7 | Rejected |
| Comparative Example 6 | 188 | 8 | 18 | 10 | 1.4 | Rejected |
| Comparative Example 7 | 188 | 8 | 25 | 13 | 1.6 | Rejected |

INDUSTRIAL APPLICABILITY

The film obtained by the production method and apparatus of this invention has excellent optical properties and solves both the troubles of foreign matter defects on the surface thereof and crystallization defects, though it is difficult to solve both the troubles by the conventional technique of producing a film having large thickness fluctuation. The film of this invention is mainly suitable for display-related application.

MEANINGS OF SYMBOLS

1: extrusion die
2: cooling drum
3: thermoplastic resin film
4: inter-nozzle exhaust mechanism
5: extrusion die's proximity exhaust mechanism
6: spray nozzle
7: releasing roll
8: suction face of inter-nozzle exhaust mechanism
9: tip face of spray nozzle
10: length from just above the apex of a cooling drum along the rotating direction of the cooling drum to the landing site of the air sprayed by a first spray nozzle
11: Distance from the suction faces of an exhaust mechanism to the tip faces of spray nozzles

The invention claimed is:

1. An apparatus for producing a thermoplastic resin film, in which when a molten thermoplastic resin is cast from an extrusion die onto a cooling drum, to be cooled and solidified on the cooling drum, for producing a thermoplastic resin film, air is sprayed by spray nozzles toward the film on a side of a film surface not in contact with the cooling drum (hereinafter referred to as the anti-cooling drum-side surface), while the air near the film is sucked by an inter-nozzle exhaust mechanism simultaneously on the side of the anti-cooling drum-side surface, wherein suction faces of the inter-nozzle exhaust mechanism are installed at positions recessed from tip faces of the spray nozzles in a direction farther away from the film, wherein the inter-nozzle exhaust mechanism is perfectly separated from the spray nozzles and installed behind rear faces of the spray nozzles, and through openings are formed between the respective spray nozzles, and wherein the distance between the tip faces of the spray nozzles and the surface of the thermoplastic resin film is 5 to 30 mm.

2. The apparatus for producing a thermoplastic resin film, according to claim 1, wherein if a total amount of air sprayed per unit time is S, and a total amount of air sucked per unit time is E, then S is larger than or equal to E.

3. The apparatus for producing a thermoplastic resin film, according to claim 1, wherein one spray nozzle positioned nearest to the extrusion die among the spray nozzles has an angle adjusting mechanism capable of adjusting the angle with respect to the film surface.

* * * * *